United States Patent [19]

Ishikawa

[11] Patent Number: 5,148,104
[45] Date of Patent: Sep. 15, 1992

[54] HUB UNIT WITH PULSE ROTOR AND COVER MOUNTED SENSOR FOR SENSING ROTATIONAL SPEED

[75] Inventor: Shuuichi Ishikawa, Nakai, Japan

[73] Assignee: Nippon Seiko Kabushiki Kaisha, Tokyo, Japan

[21] Appl. No.: 679,782

[22] Filed: Apr. 3, 1991

[30] Foreign Application Priority Data

Apr. 9, 1990 [JP] Japan ............... 2-37299[U]

[51] Int. Cl.⁵ .................. G01P 3/44; F16C 32/00; F16C 19/00
[52] U.S. Cl. .................. 324/173; 188/181 R; 384/448
[58] Field of Search .......... 324/173, 174, 207.22, 324/207.25; 73/517 R, 518, 519; 384/446, 448; 310/168; 188/181 R; 340/670

[56] References Cited

U.S. PATENT DOCUMENTS

| 4,069,435 | 1/1978 | Wannerskog et al. ........... 310/168 |
| 4,783,180 | 11/1988 | Hayashi ........................... 384/448 |
| 4,797,612 | 1/1989 | Nakanishi et al. ............... 324/173 |
| 4,907,445 | 3/1990 | Okumura ......................... 73/118.1 |
| 4,978,235 | 12/1990 | Ouchi ............................. 384/448 |

FOREIGN PATENT DOCUMENTS 189775 12/1988 Japan .

*Primary Examiner*—Gerard R. Strecker
*Attorney, Agent, or Firm*—Helfgott & Karas

[57] ABSTRACT

A pulse rotor is externally supported and secured on a cylindrical face section formed on a hub. The amount by which this pulse rotor projects from an outer ring member is regulated when the pulse rotor is fitted onto the cylindrical face section for supporting. A sensor is provided on the inside of a cover which covers the open end section of the outer ring member. The axial positional relationship between the cover and the outer ring member is uniformly maintained by means of an engaging projection formed on the radially outer peripheral surface of the cover. The distance between the axial end surface of the sensor and the axial end surface of the outer ring member is controlled to a specified value by this means. As a result, the distance between the pulse rotor and the sensor is precisely controlled.

7 Claims, 6 Drawing Sheets

F I G. 9
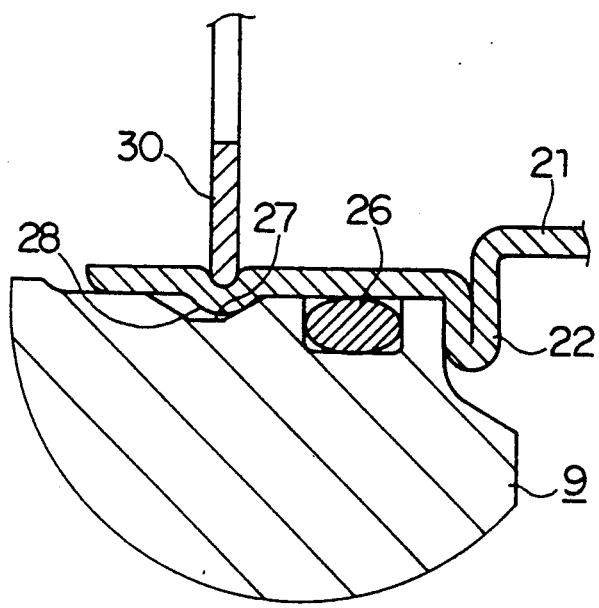
F I G. 10
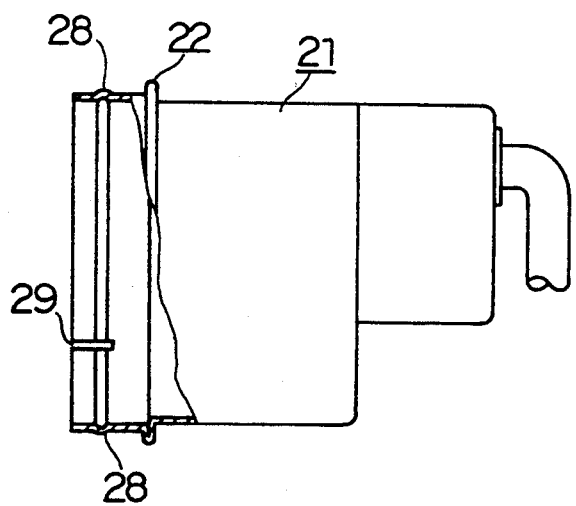
F I G 11
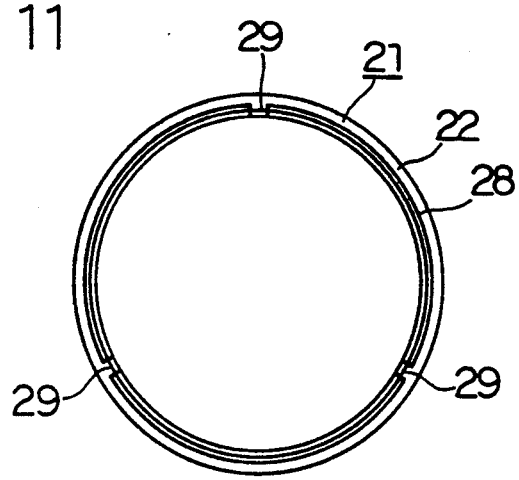

HUB UNIT WITH PULSE ROTOR AND COVER MOUNTED SENSOR FOR SENSING ROTATIONAL SPEED

BACKGROUND OF THE INVENTION

1. Field of the Invention

The present invention relates to a hub unit for sensing rotational speed, and, in particular, to a hub unit which is installed in a built-in Antilock Brake System (ABS) or Traction Control System (TCS) and is used to support the wheels of the automobile in a freely rotatable manner with respect to a suspension system and to sense the speed of rotation of the wheels.

2. Description of the Prior Art

The wheels of an automobile are supported in a freely rotatable manner through a suspension device, and it is essential that the speed of rotation of the wheels be sensed in order to control an Antilock Brake System (ABS) or Traction Control System (TCS). Conventionally, a hub unit for sensing rotational speed, as shown in FIG. 13, has been used for this purpose.

This hub unit for sensing rotational speed comprises a hub 3, an inner ring or race member 4, a nut 6, an outer ring or race member 9, and a plurality of rolling members 10.

The hub 3 is provided with an axially outer end (the left end in FIG. 13) having a flange section 1 for securing the wheel, a middle section and an axially inner end section (the right end section in FIG. 13).

A radially outwardly facing inner ring track 2a is formed on the radially outer peripheral surface of the middle section of the hub 3. The inner ring member 4 is externally secured or fitted on the radially outer peripheral surface of the middle section of the hub 3 and provided with a radially outwardly facing inner track 2b on its radially outer peripheral surface.

The nut 6 is placed in threaded engagement with the male threaded section formed on the radially outer peripheral surface of the inner end section of the hub 3. The nut 6 is tightened to press against the axially inner end surface of the inner ring member 4, and the inner ring member 4 is secured to the radially outer peripheral surface of the hub 3 in a specified position.

The outer ring member 9 is provided with a mounting section 7 on its radially outer peripheral surface to provide support on a suspension device (omitted from the drawing) and a plurality of inwardly facing outer ring tracks 8a, 8b are formed on the radially inner peripheral surface of the outer ring member 9.

The rolling members 10 are provided between the hub 3 and the outer ring member 9, and between the inner ring member 4 and the outer ring member 9.

The hub unit for sensing rotational speed is thus comprised of the hub 3, the inner ring or race member 4, the nut 6, the outer ring or race member 9, and the plurality of rolling members 10 to support the hub 3 in a freely rotatable manner on the inside of the outer ring member 9 which is supported on the suspension system.

The nut 6 is formed with a irregular section 11 on the axially inner end surface thereof. The irregular section 11 of the nut 6 functions as a pulse rotor which generates a pulse as the hub 3 rotates.

A cover 12 is mounted at an axially inner end section (the right end section in FIG. 13) with an opening of the outer ring member 9 and covers the opening of the outer ring member 9. A sensor 13 is secured to the cover 12. The axially outer end surface (the left end surface in FIG. 13) of the sensor 13 faces the irregular section 11 of the nut 6.

Through the rotational speed sensing hub unit described above, a wheel secured to the flange section 1 provided on the axially outer face section of the hub 3 is supported in a freely rotatable manner by the suspension system which supports the outer ring member 9.

The output of the sensor 13 varies according to the rotation of the wheel. The frequency of the variation of the output of the sensor 13 is proportional to the rotational speed of the wheel. For this reason, the rotational speed of the wheel is obtained by inputting the output signal from the sensor 13 to a controller (not shown). The ABS and the TCS are then suitably controlled according to the desired speed of rotation.

A distance 1 between the part which functions as the pulse rotor on the rotational speed sensing hub unit (the irregular section 11 formed on the axially inner end surface of the nut 6 in the example shown in FIG. 13) and the axially outer end surface of the sensor 13 must be precisely controlled to a suitable value for accurate sensing of the rotational speed.

The nut 6 which functions as the pulse rotor in FIG. 13 plays the role of securing the inner ring member 4 to the radially outer peripheral surface of the hub 3. This nut 6 must be firmly tightened on a male threaded section 5 of the radially outer peripheral surface of the inner end section of the hub 3. For this reason it is difficult to precisely control the positional relationship between the nut 6 and the hub 3 and the outer ring member 9.

Specifically, a suitable value for the distance 1 is an extremely small value of less than 1 mm. For this reason, the distance 1 cannot be maintained if the positional relationship between the nut 6 and the hub 3 and the outer ring member 9 deviates by even a very small amount. If the distance 1 exceeds a suitable value, there is concern that the ABS and TCS cannot perform adequately.

In particular, in the structure shown in FIG. 13, there is no method for determining whether or not the distance 1 after the hub unit is assembled is the correct value other than by checking the output of the sensor 13. However, the distance 1 cannot be adjusted during assembly. For this reason, highly precisely fabricated parts are required for the hub to maintain a suitable value for the distance 1, resulting in the high cost of manufacturing the hub unit.

SUMMARY OF THE INVENTION

An object of the present invention is to provide, with due consideration to the drawbacks of such conventional devices, a rotational speed sensing hub unit in which the distance between the pulse rotor and the sensor is always kept appropriate for accurate sensing of the rotational speed.

In the rotational speed sensing hub unit of the present invention, the distance between a pulse rotor and a sensor is maintained at a suitable value even when the high precision of the structural parts is not rigidly controlled.

The sensor is provided at a specified positional relationship with respect to the cover on the inside of a cover which is supported at a specified positional relationship with respect to an outer ring member, and a pulse rotor is externally secured on a cylindrical face section formed at the axially inner end section of the hub so as to regulate the positional relationship between the hub and the pulse rotor. When the axial positional relationship between the hub and the pulse rotor is regulated, with a specific positional relationship maintained between the outer ring member and the hub, a suitable distance is maintained between the pulse rotor and the sensor.

BRIEF DESCRIPTION OF THE DRAWINGS

These and other objects, features, and advantages of the present invention will become more apparent from the following description of the preferred embodiments taken in conjunction with the accompanying drawings, in which:

FIG. 9 is an expanded cross-sectional view of the section IX of FIG. 8.

FIG. 10 is a partly cross-sectional, side elevational view showing a cover for housing the sensor with one part cut away.

FIG. 11 is a left side elevational view of the cover of FIG. 10.

DETAILED DESCRIPTION OF THE PREFERRED EMBODIMENTS

Figure 1:
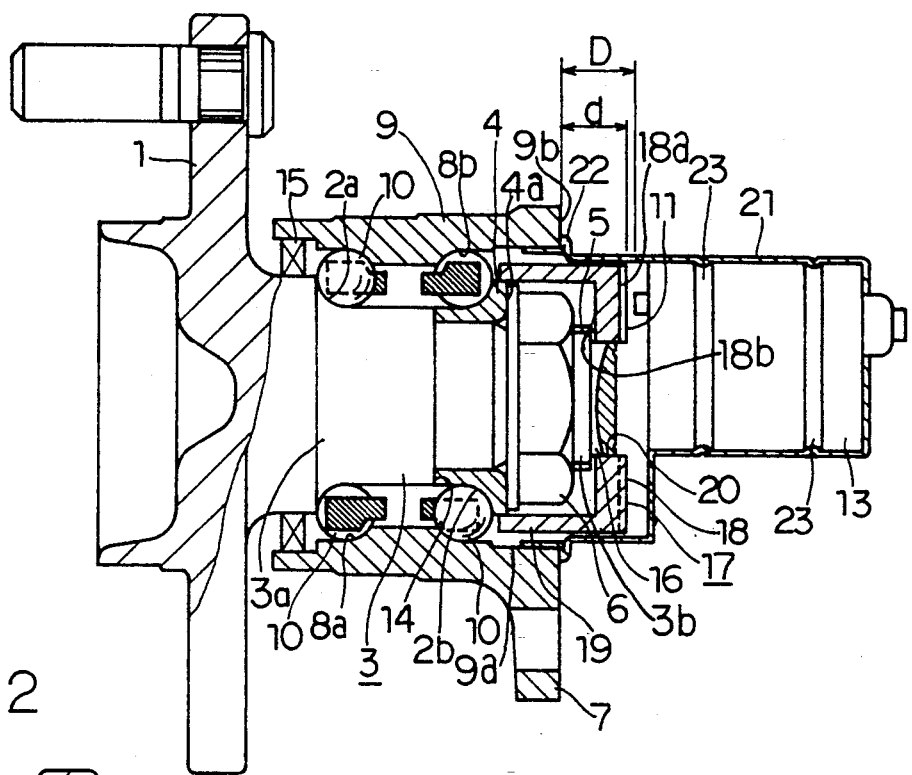
FIG. 1 is a partly cut-away, cross-sectional view of the entire structure of a first embodiment of a hub unit for sensing rotational speed of the present invention.
Figure 2:
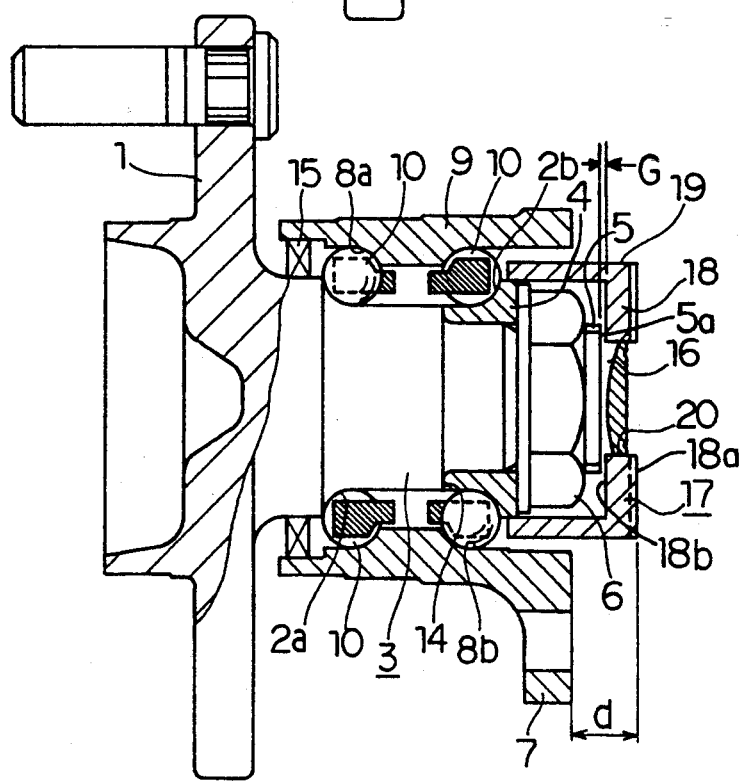
FIG. 2 is a partly cut-away, cross-sectional view showing the first embodiment of FIG. 1 with the cover and sensor removed.
Figure 3:
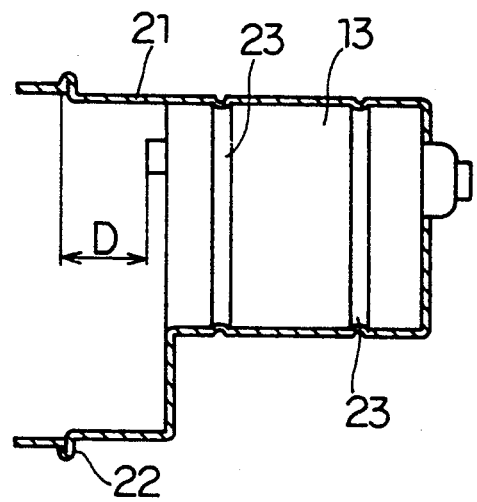
FIG. 3 is a partly cut-away, cross-sectional view showing the cover and sensor.
Figure 4:
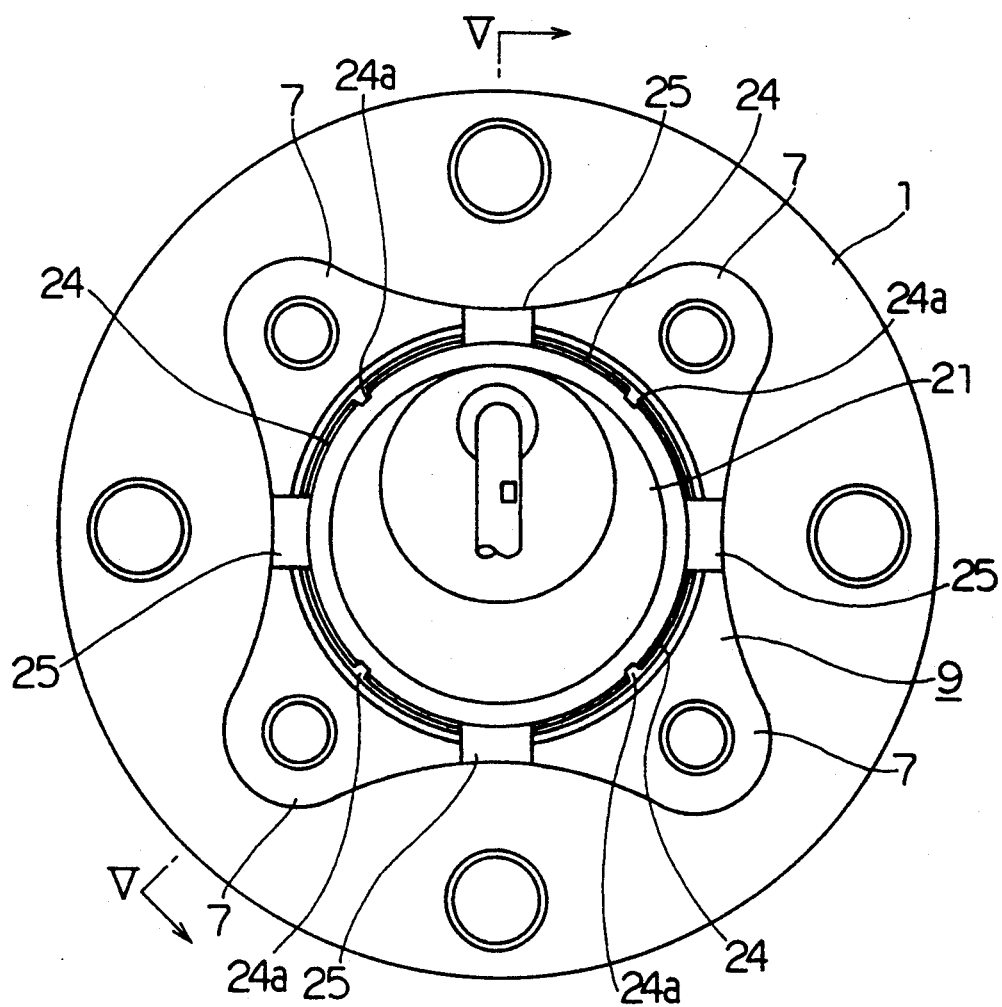
FIG. 4 is a side elevational view of a second embodiment of a hub unit for sensing rotational speed according to the present invention.
Figure 5:
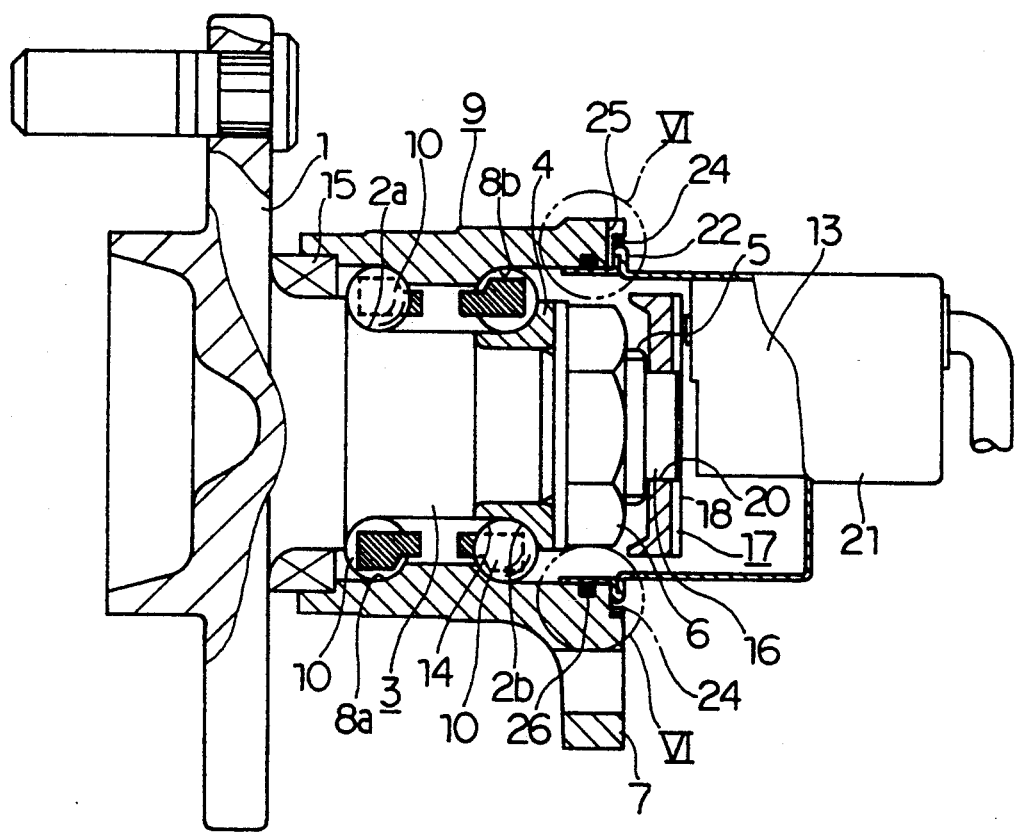
FIG. 5 is a cross-sectional view taken along the line V—V of FIG. 4.
Figure 6:
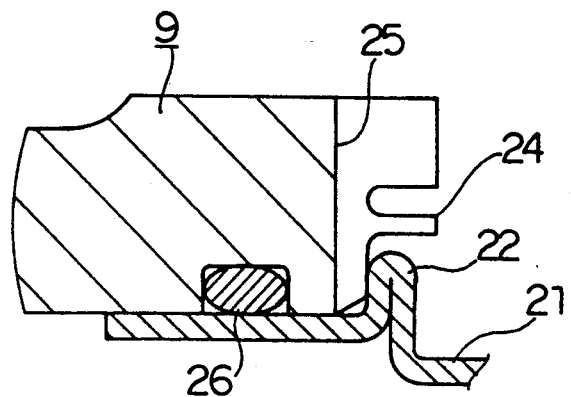
FIG. 6 is an expanded cross-sectional view of the section VI of FIG. 5.
Figure 7:
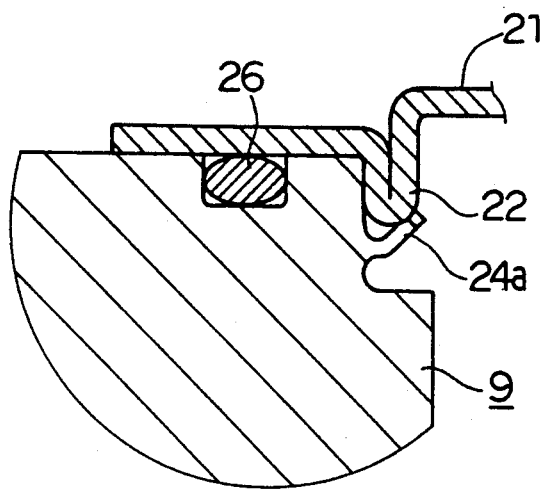
FIG. 7 is an expanded cross-sectional view of the section VII of FIG. 5.
Figure 8:
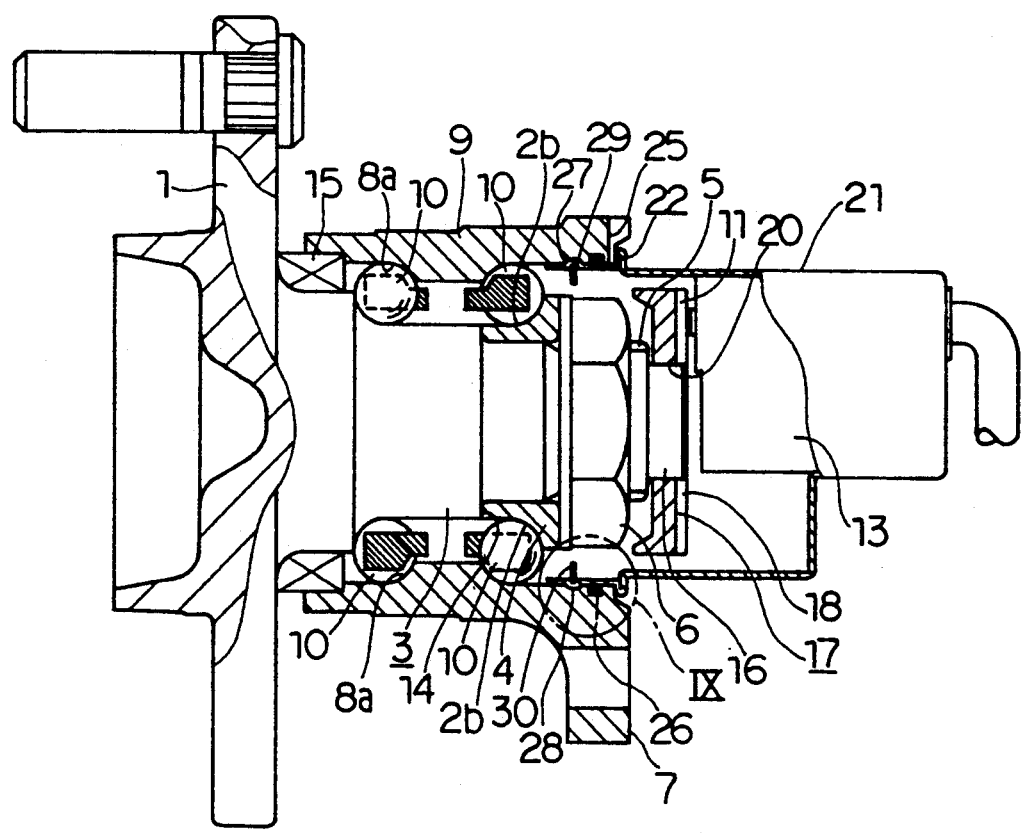
FIG. 8 is a cross-sectional view, equivalent to FIG. 5, of a third embodiment of a hub unit for sensing rotational speed according to the present invention.
Figure 12:
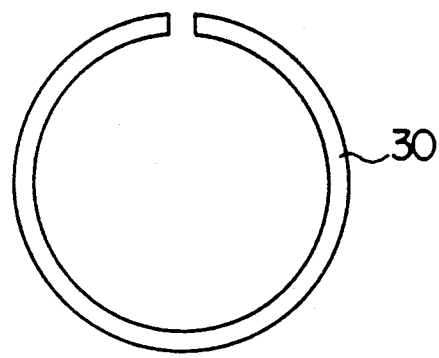
FIG. 12 is a view of a plate spring from the same direction as FIG. 11.

Now referring to FIGS. 1 to 3 which show a first embodiment of a hub unit for sensing rotational speed according to the present invention, a hub 3 is provided with an axially outer end section (the left end section in FIG. 1 and FIG. 2) having a flange section 1 for securing a wheel, a middle section 3a and an axially inner end section 3b (the right end section in FIG. 1 and FIG. 2).

The flange section 1 is formed on the radially outer peripheral surface of the axially outer end section (the left end section in FIG. 1 and FIG. 2) of the hub 3.

A radially outwardly facing inner ring track 2a and a step section 14 are formed on the radially outer peripheral surface of the middle section of the hub 3. An inner ring member 4 having a radially outwardly facing inner ring track 2b on its radially outer peripheral surface is externally secured on the radially outer peripheral surface of the hub 3 adjacent to the step section 14. One end surface of the inner ring member 4 (the left end surface in FIG. 1) is abutted to the step section 14.

Figure 13:
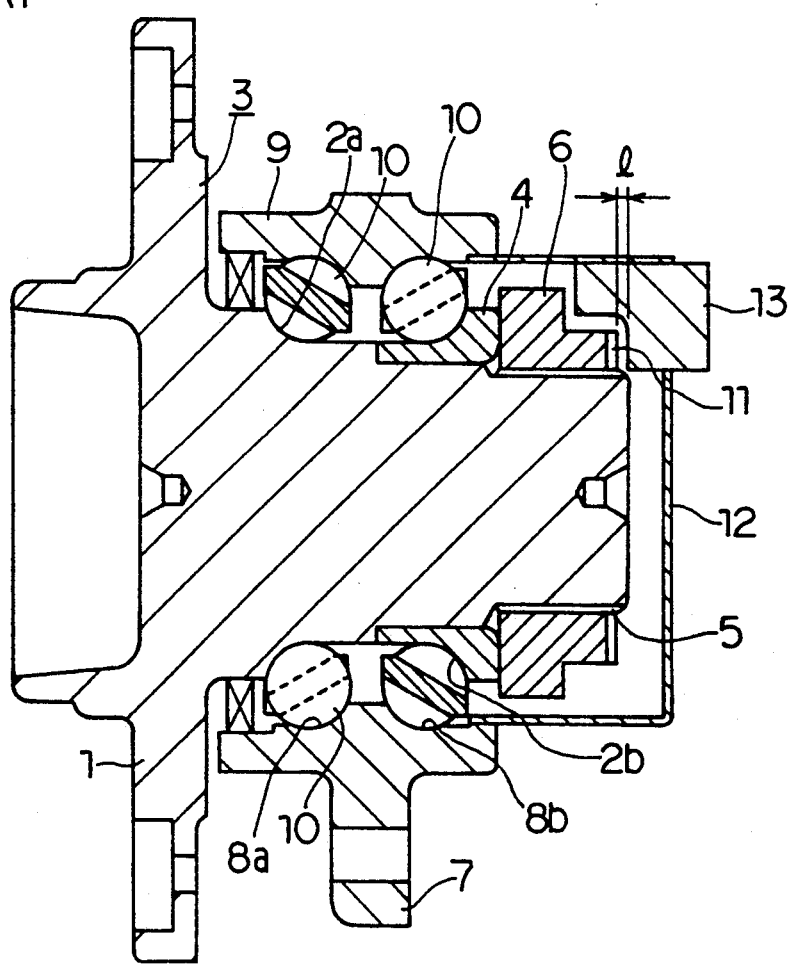
FIG. 13 is a cross-sectional view illustrating one example of a conventional structure.

Although the inner ring track 2a is directly formed on the radially outer peripheral surface of the hub 3 in FIG. 1, the inner ring track 2a can be formed on another inner ring member not integral to the hub 3 as shown in FIG. 13, so that this another inner ring member and the inner ring member 4 are externally secured or fitted on the hub 3.

A male threaded section 5 is formed on the axially inner end section of the hub 3, and a nut 6 is screwed onto this threaded section 5 and firmly tightened. The inner ring member 4 is secured to a specified part of the radially outer peripheral surface of the hub 3 by the nut 6 which applies pressure against an axially inner end surface 4a thereof.

A mounting section 7 is formed on the radially outer peripheral surface of the axially inner end section of an outer ring member 9. The outer ring member 9 is secured to the suspension system by the mounting section 7.

Also, a pair of radially inwardly facing outer ring tracks 8a, 8b are formed on the radially inner peripheral surface of the outer ring member 9. The outer ring tracks 8a, 8b are opposed to the inner ring tracks 2a, 2b, respectively.

A plurality of rolling members 10, 10 are provided between the pair of inner ring tracks 2a, 2b and the pair of outer ring tracks 8a, 8b. As a result, the hub 3 freely rotates on the inside of the outer ring member 9.

A sealing material 15 is provided between the radially inner peripheral surface of the outer ring member 9 and the radially outer peripheral surface of the hub 3 to partly define the space in which the plurality of rolling members 10 are accommodated.

A cylindrical face section or end portion 16 in which there is substantially no change in thickness in an axial direction is formed on the axially inner end section of the hub 3, such that the cylindrical face end portion 16 is placed further in the axially inner side than the male threaded section 5 to project from the axially inner end surface of the nut 6.

A pulse rotor 17 is externally fitted on and supported by the cylindrical face section 16. As a matter of course, the outer diameter of the cylindrical face section 16 is smaller than the diameter of the male threaded section 5 at the bottom of the thread grooves.

The pulse rotor 17 is provided with an annular and inwardly radially extending flange main section 18 which is formed with an irregular section on the axially inner end surface 18a thereof. An axially outer end surface 18b of flange section 18 faces nut 6. A cylindrical section 19 is formed and connected to the radially outer peripheral edge of the main section 18. The cylindrical section 19 has an axially outer open section which opens outwardly (to the left side in FIG. 1 and FIG. 2).

A circular hole 20 is formed in the center section of the main section 18. The center section of the main section 18 with this circular hole 20 is externally secured or fitted onto the cylindrical face section 16. At the same time, the axially outer open end section of the cylindrical section 19 is externally secured or fitted onto the radially outer peripheral surface of the axially inner end section of the inner ring member 4. As a result, the pulse rotor 17 is secured on the hub 3.

Incidentally, the cylindrical section 19 may be omitted.

The radially outer peripheral edge of the axially inner end surface of the cylindrical face section 16, after being inserted into the circular hole section 20, can be caulked in a radially outward direction. As a result, the main section 18 is prevented from coming loose from the hub 3.

The axially inner end section of the outer ring member 9 has an opening 9a which is closed by a cover 21. A sensor 13 which may be, for example, a magnetic type sensor, is maintained on the inside of the cover 21. However, in the case where a unit comprising alternating N and S electrodes is disposed around the circumference of the pulse rotor 17 in place of the irregular section 11, a semiconductor sensor or a Hall device sensor, or the like, is used as the sensor 13.

The cover 21 is fabricated from a metal plate by a drawing process and has an opening in the axially outer end thereof. A flange-shaped engaging projection 22 is formed closer to the opening circumferentially on a section of the radially outer peripheral surface of the cover 21. The outer diameter of the opening of the cover 21 is the same as or slightly larger than the inner diameter of the opening at the axially inner end section of the outer ring member 9. As a result, the edge section of the cover adjacent to the opening is freely interposed in the axially inner end open section of the outer ring member 9 until the engating projection 22 reaches the axially inner end surface 9b of the outer ring member 9.

In order that the sensor 13 is supported and secured in a positionally-controlled state on the inside of the cover 21, the peripheral wall of the cover 21 is partly crimped to oppose a pair of recessed grooves 23 formed on the radially outer peripheral surface of the main body of the sensor 13. This prevents the sensor 13 from slipping out of place inside the cover 21.

Accordingly, the distance D between the axially outer surface of the engaging projection 22 and the axially outer end surface of the sensor 13 is maintained at a present distance without any deviation. As required, a plate-shaped backing is interposedly maintained between te back surface of the cover 21 and the end surface of the sensor 13 so that any backlash of the sensor 13 inside the cover 21 is prevented.

The rotational speed sensing hub unit of the present invention with the above-described configuration senses the rotational speed of the wheel secured to the flang section 1 of the hub 3, with the wheels of the vehicle supported in a freely rotatable manner on the suspension system in the same manner as with a conventional unit.

In particular, in the rotational speed sensing hub unit of the present invention in the state where the pulse rotor 17 is secured to the hub 3, the mutal positonal relationship between the pulse rotor 17 and the hub 3, specifically, the distance d from the axially inner end surface 9b of the outer ring member 9 to the axially inner end surface 18a of the pulse rotor 17, is freely adjustable. The adjustment of the distance d is performed by changing the depth of the fitting engagement between the cylindrical face section 16 formed on the axially inner end section of the hub 3 and the circular hole section 20 formed at the center of the main section 18 of the pulse rotor 17, and the depth of the fitting engagement between the open end section of the cylindrical section 19 of the pulse rotor 17 and the inner ring member 4.

In addition, the distance D between the outside surface of the flange-shaped engaging projection 22 formed on the radially outer peripheral surface of the cover 21 and the axially outer end surface of the sensor 13 remains in the present state with substantially no deviation as outlined above. Accordingly, the positional relationship between the axially outer end surface of the sensor 13, which is securely maintained on the cover 21, and the axially inner end surface of the outer ring member 9 is normally fixed in the state where the axially outer end section of the cover 21 is secured to the axially inner end section of the outer ring member 9. In addition, the positional relationship between the hub 3 and the outer ring member 9 in the assembled state through the plurality of rolling members 10 is normally fixed.

Accordingly, it is possible to set at a suitable value the distance between the axially inner end surface of the pulse rotor 17 and the axially outer end surface of the sensor 13 through the steps that the depth of the fitting engagement at the two abovementioned engaging positions is regulated, that a specific positional relationship of the pulse rotor 17 with respect to the hub 3 is set, and that the cover 21, which maintains and secures the sensor 13, is then secured to the outer ring member 9.

Specifically, the distance between the axially inner end surface of the pulse rotor 17 and the axially outer end surface of the sensor 13 is the difference between the distance D between the axially outside surface of the projection 22 formed on the radially outer peripheral surface of the cover 21 and the axially outer end surface of the sensor 13, and the distance d from the axially inner end surface of the outer ring member 9 to the axially inner en surface of the pulse rotor 17 ($=D-d$). The distance D is fixed, while minute adjustments of the distance d are freely made through measuring the distance d. For this reason, precise control is possible in setting the distance between the axially inner end surface (the right end surface in FIG. 1 and FIG. 2) of the pulse rotor 17 and the axially outer end surface (the left end surface in FIG. 1 and FIG. 2) of the sensor 13, so that adjustment is not required after assembly. As also shown in FIG. 2, a gap G is provided between a radial shoulder 5a of the axially inner end section 5 of the hub 3 and the face 18b of the flange section 18 of the pulse rotor 17.

In addition, in the case of the embodiment shown in the drawings, the pulse rotor 17 is securely set at two positions, specifically, the position where the circular hole section 20 engages the cylindrical face section 16 and the position where the cylindrical section 19 engages the inner ring member 4. For this reason the pulse rotor 17 is reliably prevented from inclining. Because the pulse rotor 17 cannot incline, the distance between the irregular section 11 of the pulse rotor 17 and the end surface of the sensor 13 is fixed to a constant value during the rotation of the hub 3, and a stable output can be obtained.

The rotational speed sensing hug unit of the present invention provides improved reliability for the ABS and TCS by means of accurate rotational speed detection, because the distance between the pulser rotor and the sensor can be precisely adjusted.

In a second embodiment of the present invention shown in FIG. 4 to FIG. 7, the cover 21 is reliably supported by the outer ring member 9, and, if required, the cover 21 can be removed from the outer ring member 9.

A plurality of arc-shaped projections 24 is formed in a plurality of positions (four positions are shown in the drawings) on the axially inner open end section of the outer ring member 9. The flange-shaped engaging projection 22 formed closer to the opening circumferentially on the radially outer peripheral surface of the cover 21 is held down by caulking portions 24a of the arc-shaped projections 24 for engagement after the axially outer end section of the cover 21 is inserted into the opening in the axially inner end of the outer ring member 9. As a result, the cover 21 cannot be easily separated from the outer ring member 9.

A plurality of indented sections 25 is formed in a plurality of positions (four positions are shown in the drawings) on the axially inner end surface of the outer ring member 9. The tip of a tool such as a screwdriver or the like can be passed through the indented sections 25 and freely inserted between the engaging projection 22 and the end surface of the outer ring member 9, so that the support of the cover 21 for the outer ring member 9 can be released. Accordingly, this embodiment provides reliable support for the outer ring member 9 by the cover 21, and also provides convenience that the expensive sensor 13 once used can be reused in another hub unit.

An O-ring 26 prevents the entry of extraneous material or rainwater inside the cover 21. In addition, the sensor 13 is supported inside the cover 21 by friction or by an adhesive.

A third embodiment of the present invention shown in FIG. 8 to FIG. 12 exhibits the same type of effects as the second embodiment. An indented groove 27 for engagement is formed on the radially inner peripheral surface of the axially inner end section of the outer ring member 9. Also, a dike-shaped projection 28 for engagement with the groove 27 is formed on the radially outer peripheral surface of the axially outer end section of the cover 21 closer to the opening than the flange-shaped engaging projection 22. A plurality of notches 29 is formed at a plurality of positions (threee postions in the example shown in the drawings) on the axially inner end edge of the cover 21. By the presence of these notches 29, the outer diameter of the dike-shaped projection 28 can be reduced. A generally annular plate spring 30 whit a cutout is provided in the groove as an elastic backup for the dike-shaped projection 28. As a result, the cover 21 reliably engages the outer ring member 9 by the engaging indented groove 27 and the dike-shaped projection 28.

The function of the indented sections 25 formed for tool operation in the axially inner end surface of the outer ring member 9 is the same as in the second embodiment.

What is claimed is:

1. A hub unit for sensing rotational speed for use with a suspension system, comprising:

a hub including an axially outer end section having an outer flange for securing a wheel, a middle section having a radially outer peripheral surface on which a radially outwardly facing inner ring track is formed, and an axially inner end section having a first portion with a male thread thereon and a second portion extending in an axial direction of the hub from said first portion and having an outer diameter smaller than a minor diameter of said male thread;

an inner ring member externally secured on the radially outer peripheral surface of the middle section of the hub and having an axially inner end surface and a radially outer peripheral surface partially forming said radially outwardly facing inner ring track;

a nut secured on said first portion of said inner end section so as to apply pressure to the inner end surface of the inner ring member to secure the inner ring member in a predetermined position on said radially outer peripheral surface of said middle section, said second portion projecting from said nut in said axial direction;

an outer ring member having a central opening receiving said middle section, said inner ring member and said nut, said outer ring member having an axially inner end face, a radially inner peripheral surface on which a plurality of radially inwardly facing outer ring tracks are formed, and a radially outer peripheral surface on which a mounting section of said outer ring member is formed for support by the suspension system;

a plurality of rolling members provided between the hub and the outer ring member;

a pulse rotor having a radially inwardly extending flange portion with a circular hole therein and a cylindrical portion connected to said flange portion and having an axially outer opening, and the radially outer peripheral surface of the inner ring member being fitted into said axially outer opening of said cylindrical portion.

a sensor supported on the outer ring member so as to face the pulse rotor in said axial direction;

a cover mounted to said outer ring member and having an axially outer end section with an opening formed therein and a stop projection formed thereon;

said radially inwardly extending flange portion of said pulse rotor having a first end face which faces said nut and a second end face which faces said sensor;

said second portion of said inner end section of said hub being fitted into said circular hole of said flange portion of said pulse rotor such that a distance is provided between said inner end face of said outer ring member and said second end face of said flange portion of said pulse rotor and a gap is formed between a radial shoulder of said first portion of said inner end section of said hub and said first end face of said flange portion so that said pulse rotor is secured on said inner end section of the hub to a specified position and said sensor is maintained and secured in said cover such that said axially outer end section of said cover adjacent said central opening is fitted into said outer ring member with said stop projection abutting against said inner end face of said outer ring outer member whereby a mounting position of said cover relative to said outer ring member is controlled.

2. The hub unit for sensing rotational speed of claim 1, wherein said radially outwardly facing inner track is formed directly on said radially outer peripheral surface of said middle section.

3. The hub unit for sensing rotational speed of claim 2, wherein said stop projection of said cover is dike-shaped and said outer ring member has at said inner end face thereof an idented groove engaging said dike-shaped projection whereby said cover is prevented from separating from said outer ring member.

4. The hub unit sensing rotational speed of claim 1, wherein said second portion of said axially inner end section of the hub has a radially outer peripheral edge in which a crimped part is formed so that the pulse rotor is prevented from coming loose from the hub.

5. The hub unit for sensing rotational speed of claim 1, wherein said inner end face of said outer ring member is crimped toward said stop projection whereby said cover is prevented from separating from said outer ring member.

6. The hub unit for sensing rotational speed of claim 1, wherein said stop projection of said cover is dike-shaped and said outer ring member has at said inner end face thereof an indented groove engaging said dike-shaped projection whereby said cover is prevented from separating from said outer ring member.

7. The hub unit for sensing rotational speed of claim 1, wherein said stop projection of said cover is dike-shaped and said outer ring member has at said dinner end face thereof an indented groove engaging said dike-shaped projection whereby said cover is prevented from separating from said outer ring member.

* * * * *